(12) United States Patent
Osborne et al.

(10) Patent No.: US 8,943,078 B2
(45) Date of Patent: Jan. 27, 2015

(54) METHODS AND SYSTEMS FOR SIMPLIFYING OBJECT MAPPING

(71) Applicant: Catavolt, Inc., Alpharetta, GA (US)

(72) Inventors: Glenn William Osborne, Roswell, GA (US); George Ibrahim Mashini, Woodstock, GA (US)

(73) Assignee: Catavolt, Inc., Alpharetta, GA (US)

( * ) Notice: Subject to any disclaimer, the term of this patent is extended or adjusted under 35 U.S.C. 154(b) by 0 days.

(21) Appl. No.: 13/830,667

(22) Filed: Mar. 14, 2013

(65) Prior Publication Data

US 2013/0204887 A1 Aug. 8, 2013

Related U.S. Application Data

(63) Continuation of application No. 12/829,680, filed on Jul. 2, 2010, now Pat. No. 8,423,561.

(60) Provisional application No. 61/222,557, filed on Jul. 2, 2009.

(51) Int. Cl.
*G06F 7/00* (2006.01)
*G06F 17/30* (2006.01)

(52) U.S. Cl.
CPC .... *G06F 17/30283* (2013.01); *G06F 17/30557* (2013.01)
USPC .......................................... 707/756; 707/803

(58) Field of Classification Search
USPC .................................. 707/803, 756
See application file for complete search history.

(56) References Cited

U.S. PATENT DOCUMENTS

| | | | |
|---|---|---|---|
| 6,061,515 A | 5/2000 | Chang et al. | |
| 6,279,008 B1 * | 8/2001 | Ng et al. | 1/1 |
| 6,301,605 B1 * | 10/2001 | Napolitano et al. | 709/201 |
| 7,426,735 B2 | 9/2008 | Bliss et al. | |
| 8,086,998 B2 * | 12/2011 | Bansal et al. | 717/108 |
| 2003/0028477 A1 | 2/2003 | Stevenson et al. | |
| 2004/0030685 A1 * | 2/2004 | Helles et al. | 707/3 |
| 2004/0139018 A1 | 7/2004 | Anderson et al. | |
| 2005/0216508 A1 | 9/2005 | Meijer et al. | |
| 2006/0200438 A1 | 9/2006 | Schloming | |
| 2006/0229985 A1 | 10/2006 | Lalwani et al. | |
| 2006/0253771 A1 | 11/2006 | Baschy | |
| 2007/0150522 A1 * | 6/2007 | Stakutis et al. | 707/200 |
| 2007/0150934 A1 | 6/2007 | Fiszman et al. | |
| 2007/0226241 A1 | 9/2007 | Ng et al. | |

(Continued)

OTHER PUBLICATIONS

Tom Haughey, "Transforming a Logical Data model to a Physcial Database Design—an Overview", Feb. 1, 2006, 5 pages, http://www.tdan.com/view-featured-columns/5389.

(Continued)

*Primary Examiner* — Cam-Y Truong
(74) *Attorney, Agent, or Firm* — DLA Piper LLP US (57) ABSTRACT

Methods and systems for simplifying object mapping for a client request for action. A client request for action may be received from an external interface. The external interface may comprise a human being or a computer program. The client request may be associated to a logical object in order to minimize a representational gap between the client request and a physical object using the logical object. The query request may be responded to using object relational mapping in order to simplify the external interface by minimizing the representational gap between the external interface and the physical object using the logical object.

18 Claims, 9 Drawing Sheets

(56) References Cited

U.S. PATENT DOCUMENTS

| | | | |
|---|---|---|---|
| 2009/0276419 | A1 | 11/2009 | Jones et al. |
| 2009/0319544 | A1* | 12/2009 | Griffin et al. ............ 707/100 |
| 2010/0077008 | A1* | 3/2010 | Davis et al. ............ 707/797 |
| 2010/0100952 | A1 | 4/2010 | Sample et al. |
| 2010/0162004 | A1 | 6/2010 | Dodgson et al. |

OTHER PUBLICATIONS

Craig S. Mullins, "Database Design: From Logical to Physical", Jul. 2002, 3 pages, http://www.craigmullins.com/dbta_011.htm.

http://en.wikipedia.org/wiki/Programming_in_the_large_and_programming_in_the_small (3 pages), Updated Nov. 19, 2012.

http://en.wikipedia.org/wiki/Enterprise_service_bus (6 pages) Updated Jan. 4, 2013.

"Recursive Functions of Symbolic Expressions and Their Computation by Machine, Part I," John McCarthy, Massachusetts Institute of Technology, Cambridge, Mass., Apr. 1960, http://www-formal.stanford.edu/jmc/recursive/recursive.html (33 pages).

Abelson et al., "Structure and Interpretation of Computer Programs: Second Edition", The Massachusetts Institute of Technology, pp. 6, 7, 12, 13, 16-19, 62-65, 142, 143, 220, 221, 320, 321, 374-377, 390, 391 652 and 653, Copyright 1996.

U.S. Appl. No. 12/829,680.

U.S. Appl. No. 14/106,427.

* cited by examiner

METHODS AND SYSTEMS FOR SIMPLIFYING OBJECT MAPPING

CROSS-REFERENCE TO RELATED APPLICATIONS

This application is a continuation of U.S. patent application Ser. No. 12/829,680, filed Jul. 2, 2010, which in turn claims the benefit of U.S. Provisional Patent Application 61/222,557, filed on Jul. 2, 2009, entitled "Enterprise Application Architecture", which are incorporated by reference herein in their entireties.

FIELD OF THE INVENTION

The present invention generally relates to computer software systems that store and retrieve data from a data source; and more particularly to a system, method and computer program products for mapping requests on a logical model to requests on a physical model in an object-oriented application.

DESCRIPTION OF BACKGROUND

There are many kinds of computer software, each with its own challenges and complexities. The invention described in this document is primarily for use in an area of software known as Enterprise Application Software. Enterprise software is characterized by the business functions that it automates—such as accounting, payroll, customer service, shipment tracking, supply chain, insurance, cost analysis, production planning, and more. Enterprise applications usually involve persistent data, lots of data, and many users accessing this data concurrently. Enterprise Application Software is organized within an architecture that represents the significant decisions about major components and how they interact. This architecture is known as an Enterprise Application Architecture.

A common way to describe an architecture is to decompose it into layers, and as such most discussions on enterprise architecture begin with an illustration in terms of layers. Furthermore, it is generally accepted that well-formed enterprise architectures consist of three principal layers: User Interface, Domain, and Data Source. The Domain layer (middle layer) is the focus of software development and contains object-oriented software known as business objects. Software developers design business objects with full consideration of the target platform, which includes, but is not limited to limitations in memory, CPU, networks, and databases. The collection of documents that describe the business objects in light of these limitations is known as the design model. It is well known that the design model isn't easily accessed by the User Interface, and likewise, it isn't easily persisted to a Data Source, especially in the case of relational databases. These difficult access points are known as representational gaps.

The three fundamental approaches for implementing design models that determine the extent of representational gaps are: top-down, bottom-up, and meet-in-the-middle. These approaches center around the flexibility of the relational database. The most common approach is bottom-up or meet-in the middle because most enterprises have databases in production and databases can't be easily changed. The top-down approach is not often seen in production and is most suitable for embedded systems or application prototypes. The domain modeling approach chosen affects the representational gaps because of the bias in the direction of the approach. The top-down approach favors the conceptual model and results in complex database mappings from the design model to the database. The bottom-up approach favors the database and results in complex mappings between the user interface and the design model. The meet-in-the-middle approach tries to split the difference.

All of the aforementioned approaches have one thing in common; they implement a compromised design model. The demands of the user interface and the complexities of mapping to the database tug at the domain model causing undesirable changes. There are inevitable situations in which the purity of the object model must be compromised, such as for storage in a relational database. Whether you start at the top, bottom, or middle, there are compromising forces pulling the domain model in opposite directions. These forces seem to increase as complexity increases:
1) Increasing complexity makes it important to hide details from the users of the domain model. Hiding details using abstractions pulls the domain model towards the user interface. Therefore an original bottom-up design will be pulled towards the user interface as programmers build abstractions instead of complex mappings in the user interface.
2) Increasing complexity usually involves more database tables and complex relations resulting in a more normalized database. Therefore an original top-down design will be pulled towards the database as programmers encapsulate rich behavior with the database structure. Ultimately, this tug-of-war results in overly complicated user interfaces and overly complicated database mappings.

SUMMARY OF THE INVENTION

Embodiments of the present invention provide a system, method and computer program products for mapping requests on a logical model to requests on a physical model in an object-oriented application.

An exemplary embodiment includes a method for simplifying object mapping for user interfaces for on a computer system. The method includes receiving a client request for action and associating the client request to at least one logical object. The method further includes converting the at least one logical object to at least one physical object that resides in an object relational mapping, and mapping between the at least one physical object and at least one relational database.

Another exemplary embodiment includes a system for simplifying object mapping for user interfaces for on a computer system. Briefly described, in architecture, one embodiment of the system, among others, can be implemented as follows. The system includes a conceptual module that associates the client requests to at least one logical object and converts the at least one logical object to at least one physical object that resides in an object relational mapping, and an object relational mapping module for mapping between physical objects and at least one relational database.

These and other aspects, features and advantages of the invention will be understood with reference to the drawing figure and detailed description herein, and will be realized by means of the various elements and combinations particularly pointed out in the appended claims. It is to be understood that both the foregoing general description and the following brief description of the drawing and detailed description of the invention are exemplary and explanatory of preferred embodiments of the invention, and are not restrictive of the invention, as claimed.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

The primary goal of the present invention is to virtually eliminate the representational gaps between the user interface and the domain, and the domain and the data source. This allows the user interface to be very close to the domain, and the domain to be very close to the data source. The present invention accomplishes this effect by splitting the domain model in two, placing a logical model on top of a physical model. Instead of the representational gaps existing outside the domain layer, they are internalized to the domain layer itself; encapsulated between the logical and physical models.

Figure 1:
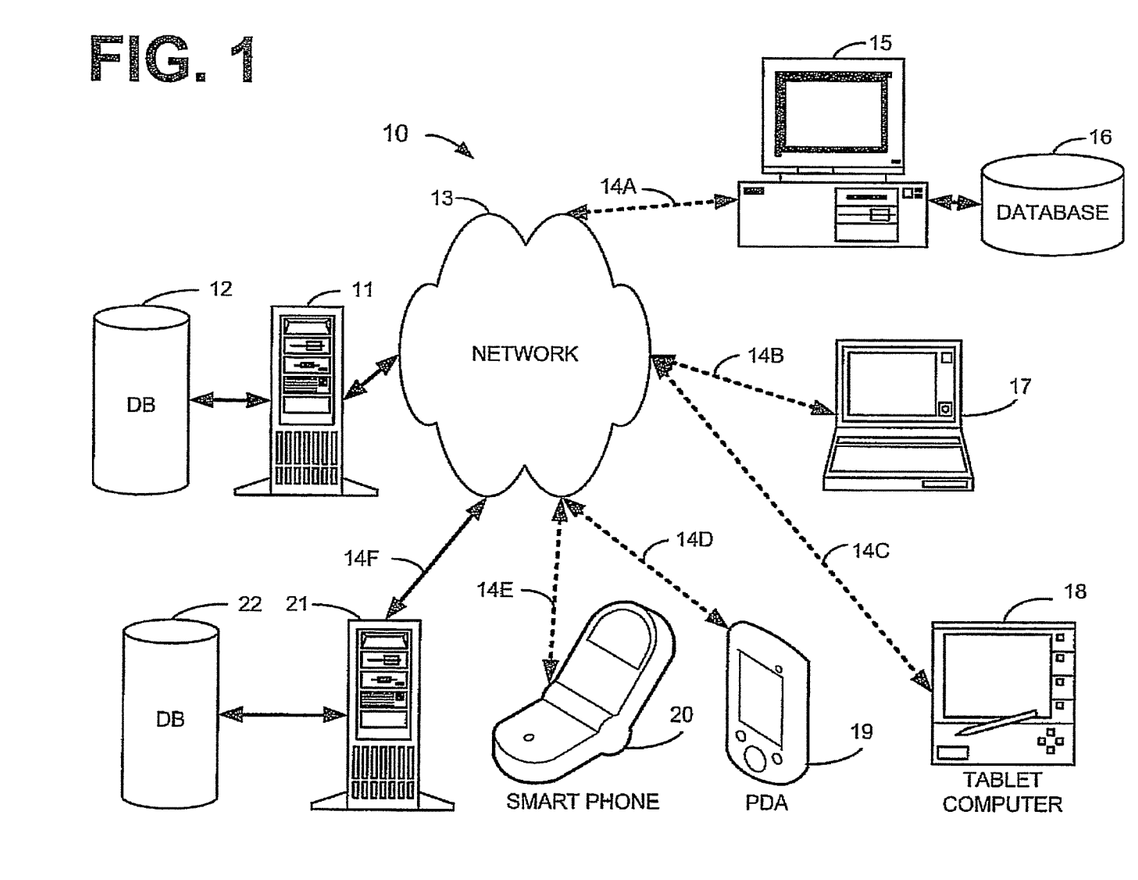
FIG. 1 is a block diagram illustrating an example of the network environment for the dialogue model system of the present invention, the dialogue model system maps requests on a logical model to requests on a physical model.

Referring now to the drawings, in which like numerals illustrate like elements throughout the several views. FIG. 1 illustrates an example of the basic components of a system 10 using the dialogue model system on a network used in connection with the preferred embodiment of the present invention. The system 10 includes a server 11 and the remote devices 15 and 17-20 that utilize the dialogue model system of the present invention.

Each remote device 15 and 17-20 has applications and can have a local database 16. Server 11 contains applications, and a database 12 that can be accessed by remote device 15 and 17-20 via connections 14(A-E), respectively, over network 13. The server 11 runs administrative software for a computer network and controls access to itself and database 12. The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computer, pocket PCs, PDAs, pagers, WAP devices, non-WAP devices, cell phones, palm devices, printing devices and the like. Included with each remote device 15 and 17-20 is an ability to request relevant material from a large collection of documents. Thus, when a user at one of the remote devices 15 and 17-20 desires to utilize the dialogue model system on the World Wide Web from the database 12 at the server 11, the remote device 15 and 17-20 communicates over the network 13, to access the server 11 and database 12.

Third party computer systems 21 and databases 22 can be accessed by the dialogue model system 100 on server 11 in order to provide access to additional collections of documents. Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
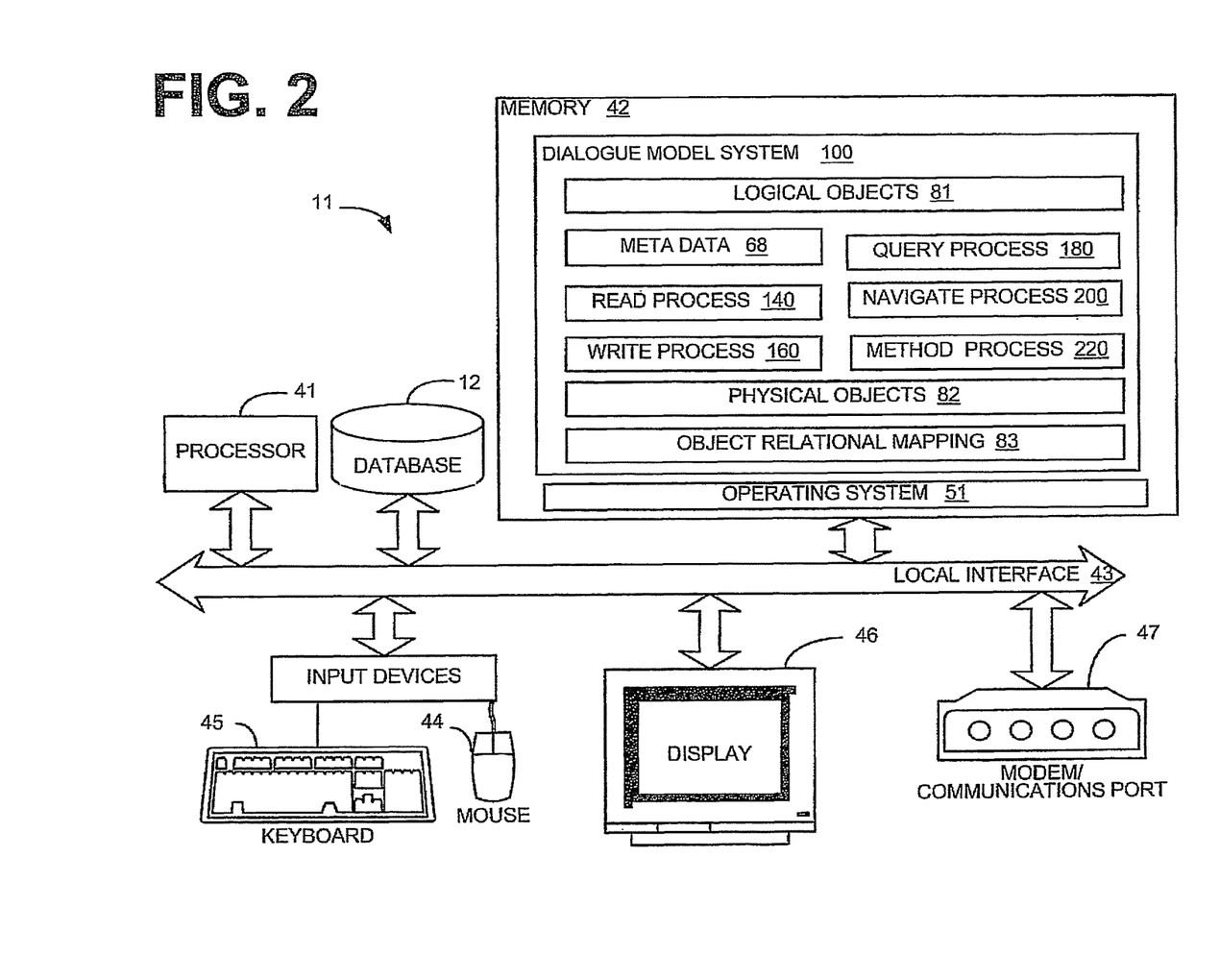
FIG. 2 is a block diagram illustrating an example of a server utilizing the dialogue model system of the present invention, as shown in FIG. 1.

Illustrated in FIG. 2 is a block diagram demonstrating an example of server 11, as shown in FIG. 1, utilizing the dialogue model system 100 of the present invention. Server 11 includes, but is not limited to, PCs, workstations, laptops, PDAs, palm devices and the like. The processing components of the third party computer systems 21 are similar to that of the description for the server 11 (FIG. 2).

Generally, in terms of hardware architecture, as shown in FIG. 2, the server 11 include a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a macroprocessor. Examples of suitable commercially available microprocessors are as follows: an 80.times.86 or Pentium series microprocessor from Intel Corporation, U.S.A., a PowerPC microprocessor from IBM, U.S.A., a Sparc microprocessor from Sun Microsystems, Inc., a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the dialogue model system 100 of the present invention. As illustrated, the dialogue model system 100 of the present invention comprises numerous functional components including, but not limited to, logical objects 81, physical objects 82, object relational mapping 83, meta data 68, the read process 140, write process 160, query process 180, navigate process 200 and method process 220.

A non-exhaustive list of examples of suitable commercially available operating systems 51 is as follows (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 51 essentially controls the execution of other computer programs, such as the dialogue model system 100, and provides scheduling, input-output control, file and data management, memory management, and communication control and related services. However, it is contemplated by the inventors that the dialogue model system 100 of the present invention is applicable on all other commercially available operating systems.

The dialogue model system 100 may be a source program, executable program (object code), script, or any other entity comprising a set of computer program instructions to be performed. When a source program, then the program is usually translated via a compiler, assembler, interpreter, or the like, which may or may not be included within the memory 42, to operate properly in connection with the O/S 51. Furthermore, the dialogue model system 100 can be written as (a) an object oriented programming language, which has classes of data and methods, or (b) a procedure programming language, which has routines, subroutines, and/or functions, for example but not limited to, C, C++, C#, Smalltalk, Pascal, BASIC, API calls, HTML, XHTML, XML, ASP scripts, FORTRAN, COBOL, Perl, Java, ADA, .NET, and the like. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 are pursuant to the software. The dialogue model system 100 and the O/S 51 are read, in whole or in part, by the processor 41, perhaps buffered within the processor 41, and then executed.

When the dialogue model system 100 is implemented in software, as is shown in FIG. 2, it should be noted that the dialogue model system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the dialogue model system 100 is implemented in hardware, the dialogue model system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provides access to the dialogue model system 100 of the present invention on server 11 and database 12 using for example, but not limited to an Internet browser. The information accessed in server 11 and database 12 can be provided in the number of different forms including but not limited to ASCII data, WEB page data (i.e. HTML), XML or other type of formatted data.

As illustrated, the remote device 15 and 17-20 are similar to the description of the components for server 11 described with regard to FIG. 2. Hereinafter, the remote devices 15 and 17-20 will be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 3:
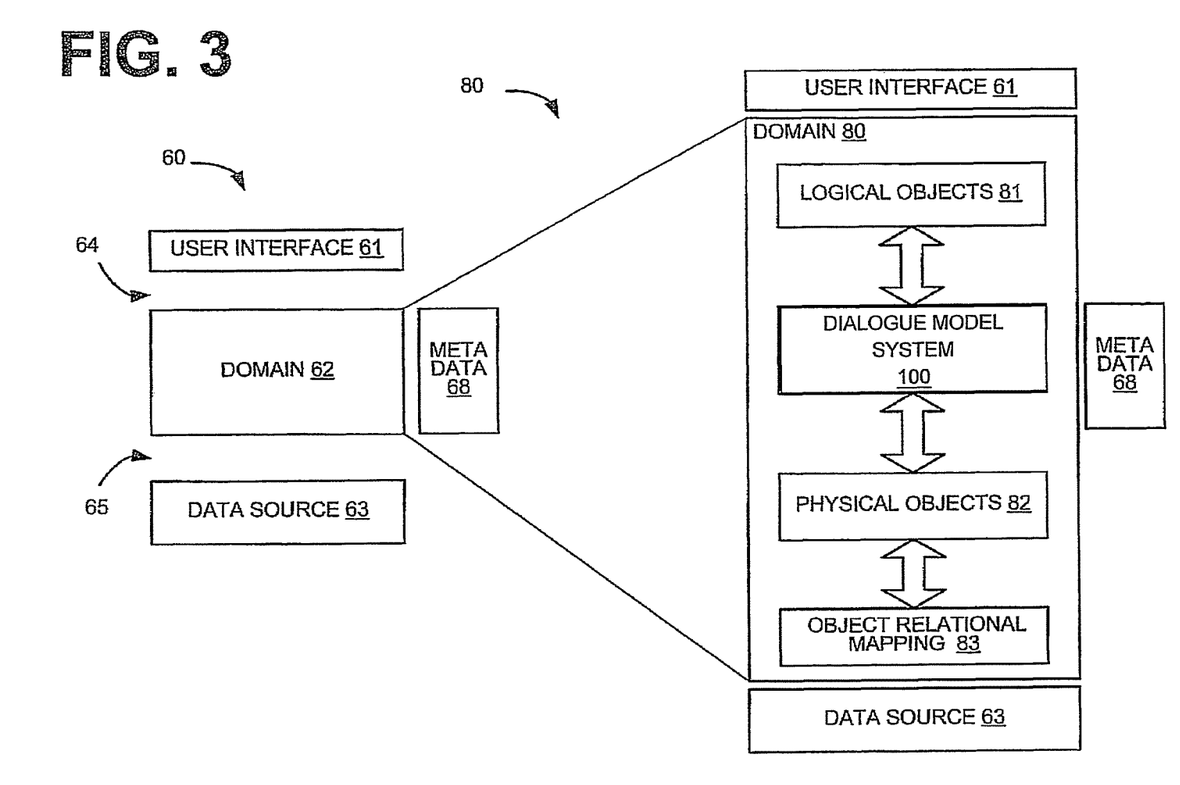
FIG. 3 is a flow chart illustrating an example of the domain layer for the dialogue model system of the present invention utilized by the server, as shown in FIG. 2.

FIG. 3 is a flow chart illustrating an example of the domain layer for the dialogue model system of the present invention utilized by the server, as shown in FIG. 2. One of the defining characteristics of a layered architecture is direction of dependency. Upper layers are dependent on lower layers, and it's best if a layer is only dependent on the layer directly below. Lower layers cannot be dependent on upper layers.

There are three fundamental approaches to implementing design models that determine the extent of representational gaps: top-down, bottom-up, and meet-in-the-middle. These approaches center around the flexibility of the relational database. The most common approach is bottom-up or meet-in-the middle because most enterprises have databases in production and databases can't be easily changed. The top-down approach is not often seen in production and is most suitable for embedded systems or application prototypes.

Layering is one of the most common techniques used by developers to break a part complicated software systems. It is widely accepted in the industry that well-formed Enterprise Application Architecture's 60 are organized into three principal layers.

User Interface 61—This layer exists to serve external actors, and the external actor might be a computer program instead of human being.

Domain 62—This layer is usually a rich domain layer consisting of objects with inheritance and sophisticated compositions. A rich domain layer deals with complexity by implementing well-known patterns, such as Strategy, Facade, and Decorator. The domain layer is software that contains the implementation of a domain model. In other words, you should be able to read a class diagram and find its elements as software objects in the domain layer. The domain model can be thought of as a class diagram. There are certainly more to object models than class diagrams, but the class diagram shows the structure of the software and is typically the first diagram used in discussions.

Data Source 63—This layer is usually an SQL database but could be other sources of data including web services.

The domain modeling approach chosen affects the representational gaps because of the bias in the direction of the approach. The meet-in-the-middle approach tries to split the difference. The top-down approach favors the conceptual model and results in complex database mappings from the design model to the database. The bottom-up approach favors the database and results in complex mappings between the user interface and the design model.

Whether one starts at the top, bottom, or middle, there are compromising forces pulling the domain layer in opposite directions. These forces tend to increase as complexity increases. Increasing complexity makes it important to hide details from the users of the domain layer. A common way to hide details from users is to abstract the domain layer, which is a move away from the database. Therefore, an original bottom-up design is pulled towards the user interface. Increasing complexity involves more database tables and complex relations resulting in a more normalized database. Object-relational mapping has limitations and works best when the objects resemble tables. Therefore, an original top-down design is pulled towards the database as programmers try to efficiently map objects to tables. Ultimately, this tug-of-war results in overly complicated user interfaces and overly complicated database mappings.

The primary goal of the dialogue model system is to minimize representational gaps. This allows the user interface to be very close to the domain, and the domain to be very close to the data source. This results in thinner, simpler, and more efficient user interfaces and thinner, simpler, and more efficient data source mappings.

The dialogue model system 100 removes representational gaps 64 and 65 by splitting the domain layer in two, placing a logical layer on top of a physical layer. Instead of the representational gaps existing outside the domain layer, they are internalized to the domain layer itself—encapsulated into a single mapping between the logical layer (i.e. logical objects. 81) and the physical layer (i.e. physical objects 82) and object relational mapping 83.

Figure 4:
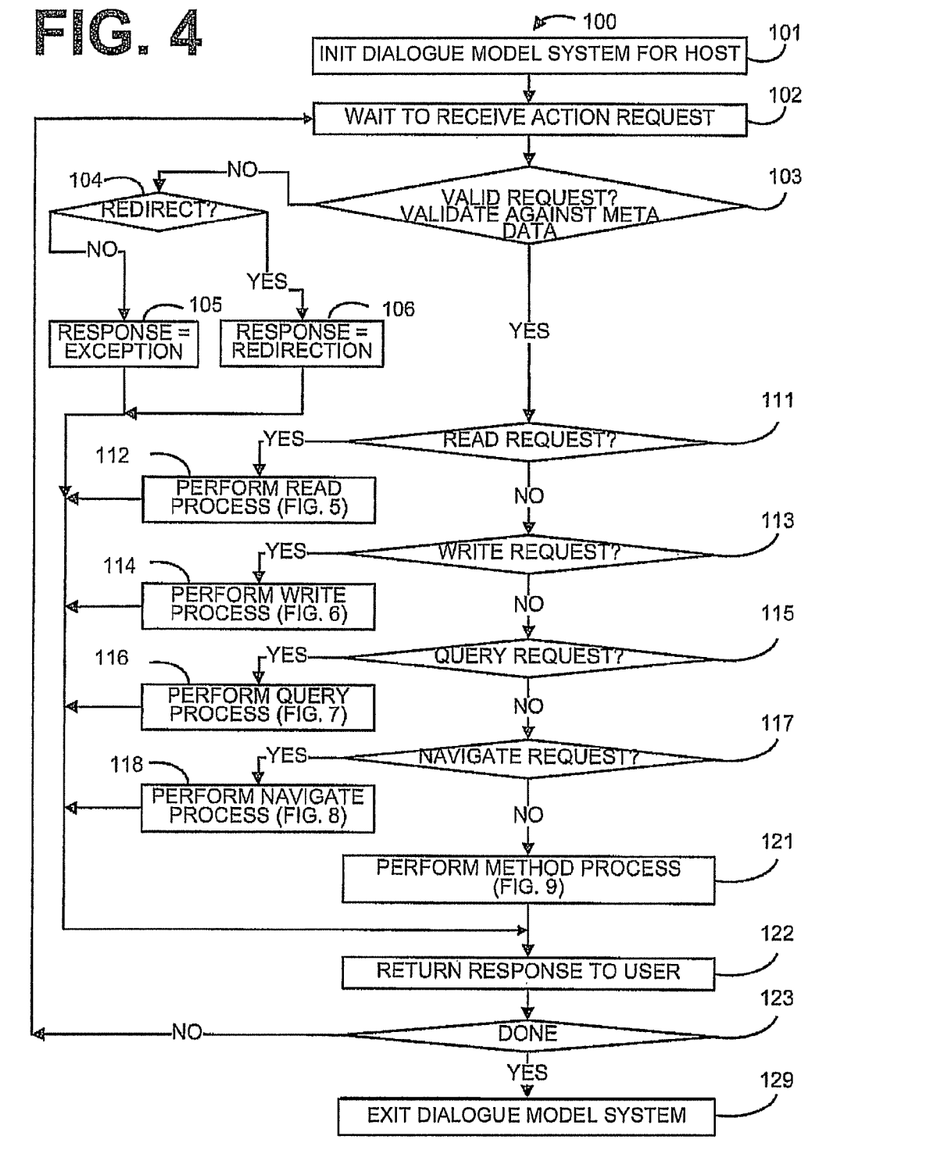
FIG. 4 is a flow chart illustrating an example of the operation of the dialogue model system of the present invention utilized by the server, as shown in FIG. 2.

FIG. 4 is a flow chart illustrating an example of the operation of the dialogue model system 100 of the present invention utilized by the server 11, as shown in FIG. 2. The dialogue model system 100 takes place inside of the domain 80. FIG. 4 illustrates the fundamental process that takes place when a read process 140, write process 160, query process 180, navigate process 200, or method process 220 is received. The dialogue model system 100 receives dynamic requests in terms of the logical objects 81. The request is dynamic such that the input and output parameters are lists of information as opposed to a static request bound by a compiler. The request is in terms of the logical objects 81 such that lists of information are valid with regard to the logical objects 81. The request is processed inside of the domain in context of a logical model and a physical model. A logical model contains entity definitions. In correlation to each entity is a dialogue process and a collection of meta data 68 that describes the entity in terms of properties and methods. A dialogue process that contains read, write, query, method, and navigate subroutines. Each subroutine returns a dialogue response. The logical model is validated against meta data 68 where a property can be a simple value like string or number, in which case it is known as an attribute property. A property can reference another entity or collection of entities, in which case it is known as a relationship property. A dialogue process accepts an entity identifier and list of property names and returns a dialogue_response. A successful dialogue process returns a value object. If a non-recoverable error occurs, an exception is returned. If a recoverable error is found, then a redirection is returned.

First at step 101, the dialogue model system 100 is initialized. This initialization includes startup routines and processes embedded in the BIOS of the server 11. The initialization also includes the establishment of data values for particular data structures utilized in the server 11.

At step 102, the dialogue model system 100 waits to receive an action request. Once an action request is received, the dialogue model system 100 then determines if the action request is a valid request, at step 103. In one embodiment, the determination if the action request is valid is determined by validating the action request against metadata. If it is determined at step 103 that the action request is valid, then the dialogue model system 100 skips to step 111.

However, if it is determined in step 103 that the action request is not valid, then the dialogue model system 100 determines if the action request is to be redirected at step 104. If it is deter mined that at step 104 that the action request is to be redirected, then the dialogue model system 100 skips to step 106. However, if it is determined at step 104 that the action request is not to be redirected, then the dialogue model system 100 determines the appropriate exception message explaining why the action request is not valid. The dialogue model system, then skips to step 122.

At step 106, the dialogue system 100 determines the appropriate process for redirecting the action request, and then skips to step 122. A redirection is constructed with an identifier to a new dialogue model that can be used to recover from the error. The recovery usually involves invoking the write process.

At step 111, the dialogue model system 100 determines if the action received is a read request. If it is determined at step 111 that the action received is not a read request, then the dialogue model system 100 skips to step 113. However, if it is determined at step 111 that the action received is a read request, then the dialogue model system 100 perform is the read process at step 112. The read process is herein defined in further detail with regard to FIG. 5. After performing the read process, the dialogue model system 100 skips to step 122.

At step 113, the dialogue model system 100 determines if the action received is a write request. If it is determined at step 113 that the action received is not a write request, then the dialogue model system 100 skips to step 115. However, if it is determined at step 113 that the action received is a write request, then the dialogue model system 100 performs the write process at step 114. The write process is herein defined in further detail with regard to FIG. 6. After performing the write process, the dialogue model system 100 skips to step 122.

At step 115, the dialogue model system 100 determines if the action received is a query request. If it is determined at step 115 that the action received is not a query request, then the dialogue model system 100 skips to step 117 However, if it is determined at step 115 that the action received is a query request, then the dialogue model system 100 performs the query process at step 116. The query process is herein defined in further detail with regard to FIG. 7. After performing the query process, the dialogue model system 100 skips to step 122.

At step 117, the dialogue model system 100 determines if the action received is a navigate request. If it is determined at step 117 that the action received is not a navigate request, then the dialogue model system 100 skips to step 121. However, if it is deter mined at step 117 that the action received is a navigate request, then the dialogue model system 100 performs the navigate process at step 118. The navigate process is herein defined in further detail with regard to FIG. 8. After performing the navigate process, the dialogue model system 100 skips to step 122.

However, if it is determined at step 117 that the action received is not a navigate request, then the dialogue model system 100 assumes that the action is a method process and performs the method process at step 121. The method process is herein defined in further detail with regard to FIG. 9.

At step 122, the dialogue model system 100 returns the response determined by the previous actions to the user. At step 123, the dialogue model system 100 determines if there are more actions to be received for processing. If it is determined at step 123 that there are more actions to be processed, then the dialogue model system 100 returns to repeat steps 102-1 to 3. However, if it is determined at step 123 that there are no more actions to be processed, then the dialogue model system 100 exits at step 129.

Figure 5:
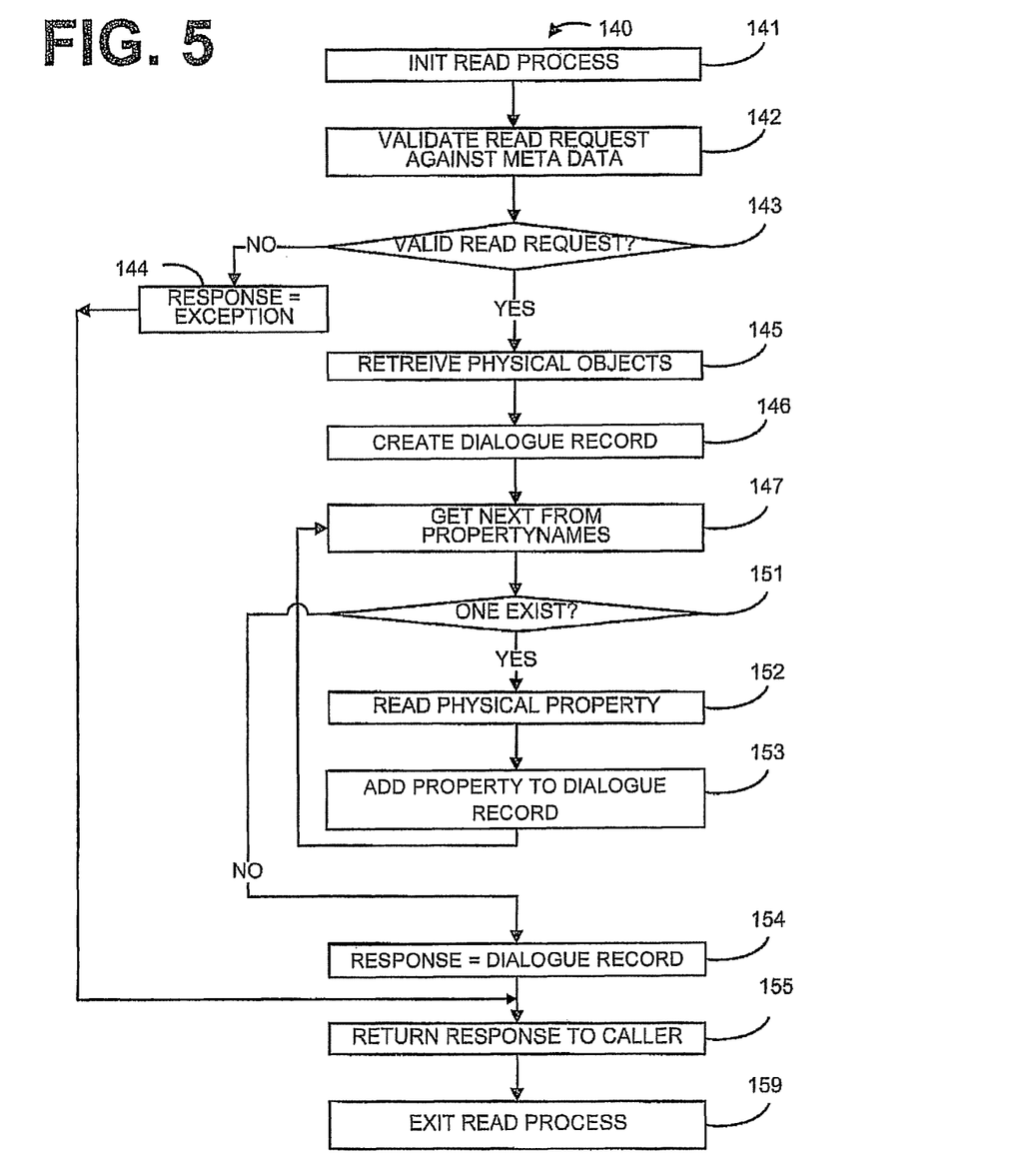
FIG. 5 is a flow chart illustrating an example of the operation of the read process on the server that is utilized in the dialogue model system of the present invention, as shown in FIGS. 2 and 4.

FIG. 5 is a flow chart illustrating an example of the operation of the read process 140 on the server 11 that is utilized in the dialogue model system 100 of the present invention, as shown in FIGS. 2 and 4. A read process accepts an entity identifier and list of property names and returns a dialogue_response. A successful read request returns a dialogue_record of corresponding values from the physical objects. If a non-recoverable error occurs, an exception is returned. If a recoverable error is found, then a redirection is returned.

First at step 141, the read process 140 is initialized. This initialization includes startup routines and processes embedded in the BIOS of the server 11. The initialization also includes the establishment of data values for particular data structures utilized in the server 11.

At step 142, the read process 140 validates the read request against metadata. At step 143, the read process 140 determines if the read request is valid. If it is determined at step 143 that the read request is valid, then the read process 140 skips to step 145. However, if it is determined in step 143 that the read request is not valid, then the read process 140 determines the appropriate exception response at step 144. After determining the appropriate exception response, the read process 140 then skips to step 155.

Mapping of the logical objects to the physical objects is illustrated in the read process 140 in steps 145-153. At step 145, the read process 140 retrieves physical objects in the physical objects 82. At step 146, the read process 140 creates a dialogue record. A dialogue record is a list of values. Paired with each value is a property name. A value is a simple value or dialogue record. A simple value is common to modern programming languages. This value includes for example, but is not limited to, String, Character, Number, Boolean, Date, Time, DateTime, ObjectRef, and Array.

At step 147, the read process 140 gets a property from the property names. At step 151 it is determined if a property exists in the property names. If it is determined at step 151 that a property does not exist, then the read process 140 then skips to step 127. However, if it is determined at step 151 that property does exist, then the read process 140 reads the physical property at step 154. At step 153, the property to the dialogue record in the read process 140 returns to step 147 get the next property from the property names.

At step 154, the read process 140 loads the dialogue record into the response to be returned to the caller at step 155. The read process than exits at step 159.

Figure 6:
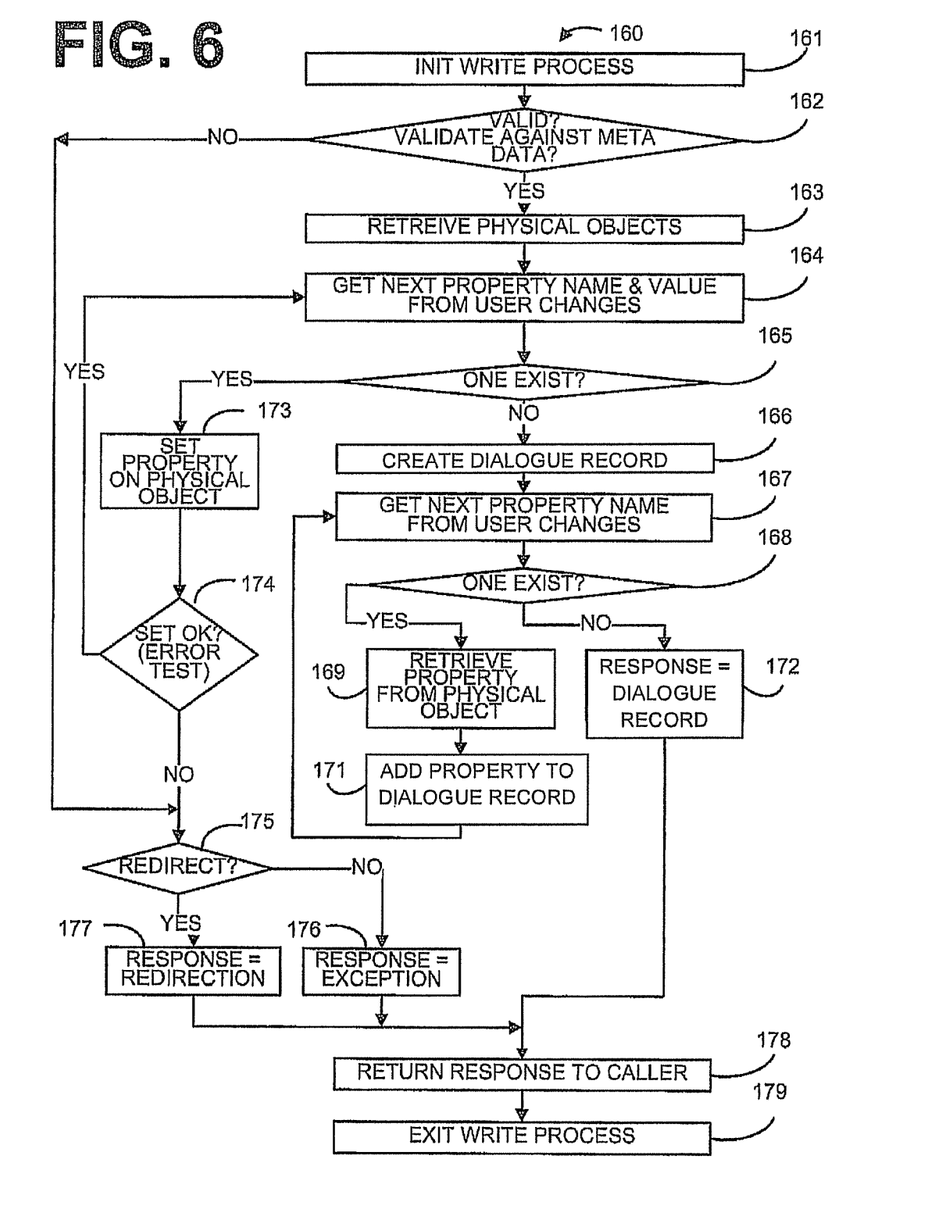
FIG. 6 is a flow chart illustrating an example of the operation of the write process utilized in the dialogue model system of the present invention, as shown in FIGS. 2 and 4.

FIG. 6 is a flow chart illustrating an example of the operation of the write process 160 utilized in the write process 160 of the present invention, as shown in FIGS. 2 and 4. A WRITE process accepts an entity identifier and list of property changes and returns a dialogue response. A successful write request returns a dialogue record containing side-effects from writing property changes to the physical objects. If a non-recoverable error occurs, an exception is returned. If a recoverable error is found, then a redirection is returned.

First at step 161, the write process 160 is initialized. This initialization includes startup routines and processes embedded in the BIOS of the server 11. The initialization also includes the establishment of data values for particular data structures utilized in the server 11.

At step 162, the write process 160 determines if the action request is a valid write request. In one embodiment, the determination if the write request is valid is determined by validating the action request against metadata 68. If it is determined at step 162 that the write request is valid, then the write process 160 skips to step 163. However, if it is determined in step 162 that the write request is not valid, then the write process 160 skips to step 175.

Mapping of the logical objects to the physical objects is illustrated in the write process 160 in steps 163-172. At step 163, the write process 160 retrieves the physical objects 82. At step 164, the write process gets the next object from property name and value from the user changes. At step 165, it is determined if a physical object exists. If it is determined at step 165 that a physical object 82 does exist, then the write process 160 skips to step 173.

However, if it is determined at step 165 that a physical object 82 does not exist in property name and value from the user changes, then the write process 160 creates a dialogue record at step 166. At step 167, the write process 160 gets the next object from the user changes. At step 168, the write process 160 if a physical object exists. If it is determined at step 168 that an object from property name does not exist, then the write process skips to step 172. However, if it is determined at step 168 that an object from property name does exist, then the write process 160 retrieves the property from the physical object at step 169 and add property to the dialogue record at step 171 and returns to repeat steps 167-172.

At step 172, the write process 160 then assigns the dialogue record created along with the objects to the response to the caller of the write process 160. The write process 160 then skips to step 178.

At step 173, write process 160 sets the property on the physical object and test to see if it is okay at step 174. If it is determined at step 174 that the set property on physical object is without error, then the write process 160 returns to repeat step 164-174. However, if it is determined at step 174 that the set property on the physical object 82 is in error, then the write process 160 determines if the error is a redirection or exception at step 175.

At step 175, write process 160 determines if the action is to be redirected. If it is determined that at step 175 that the response is to be redirected, then the write process 160 skips to step 177. However, if it is determined at step 175 that the action is not to be redirected, then the write process 160 determines the appropriate exception message explaining why the action is not valid and then skips to step 178.

At step 177, the write process 160 determines the appropriate process for redirecting the action request. A redirection is constructed with an identifier to a new dialogue model that can be used to recover from the error. The recovery usually involves invoking the write process.

At step 178, the write process 160 returns the assigned response to the caller, and then exits at step 179.

Figure 7:
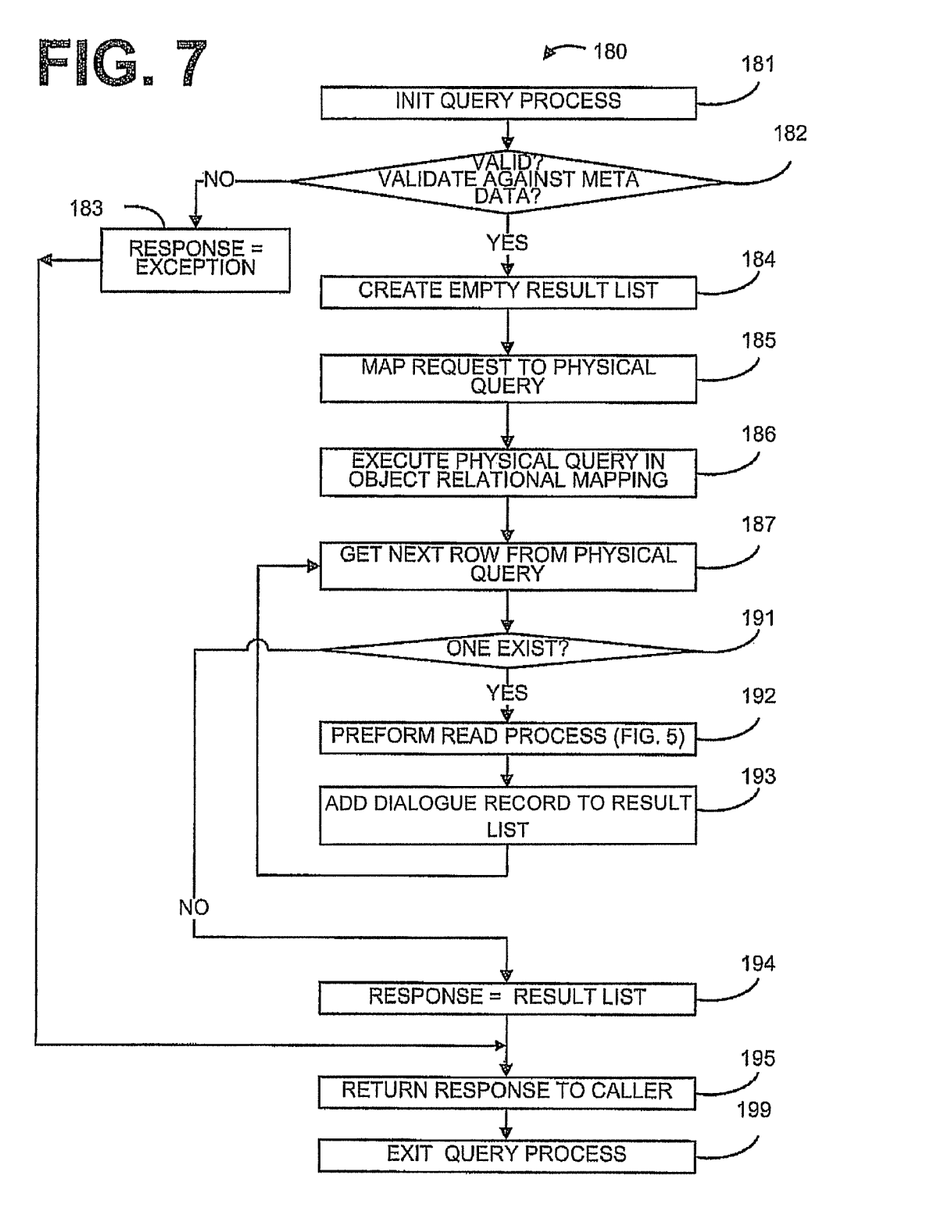
FIG. 7 is a flow chart illustrating an example of the operation of the query process utilized in the dialogue model system of the present invention, as shown in FIGS. 2 and 4.

FIG. 7 is a flow chart illustrating an example of the operation of the query process 180 utilized in the dialogue model system 100 of the present invention, as shown in FIGS. 2 and 4. A query process accepts an entity class name, criteria and ordering and returns a dialogue response. A successful query request returns a list of dialogue records corresponding to physical objects. If a non-recoverable error occurs, an exception is returned. If a recoverable error is found, then a redirection is returned.

First at step 181, the query process 180 is initialized. This initialization includes startup routines and processes embedded in the BIOS of the server 11. The initialization also includes the establishment of data values for particular data structures utilized in the server 11.

At step 182, the query process 180 validates the query request against metadata and determines if the query request is valid. If it is determined at step 182 that the query request is valid, then the query process 180 skips to step 184. However, if it is determined in step 182 that the query request is not valid, then the query process 180 determines the appropriate exception response at step 183. After determining the appropriate exception response, the query process 180 then skips to step 195.

At step 184, the query process 180 creates an empty result list. At step 185, the query process 180 maps the request to a physical query. Mapping of the logical objects to the physical objects is illustrated in the query process 180 in step 185. At step 186, the query process 180 execute the physical query in the object relational mapping 83.

At step 187, the query process 180 gets a first/next row from the physical query results. At step 191 it is determined if a row exists in the physical query results. If it is determined at step 191 that a row does not exist, then the query process 180 then skips to step 194. However, if it is determined at step 191 that a row does exist, then the query process 180 performs the read process (FIG. 5) at step 192. At step 193, the query process 180 adds the dialogue record to the result list and returns to step 187 get the next row from the physical query result.

At step 194, the query process 180 loads the result list into the response to be returned to the caller at step 195. The query process than exits at step 199.

Figure 8:
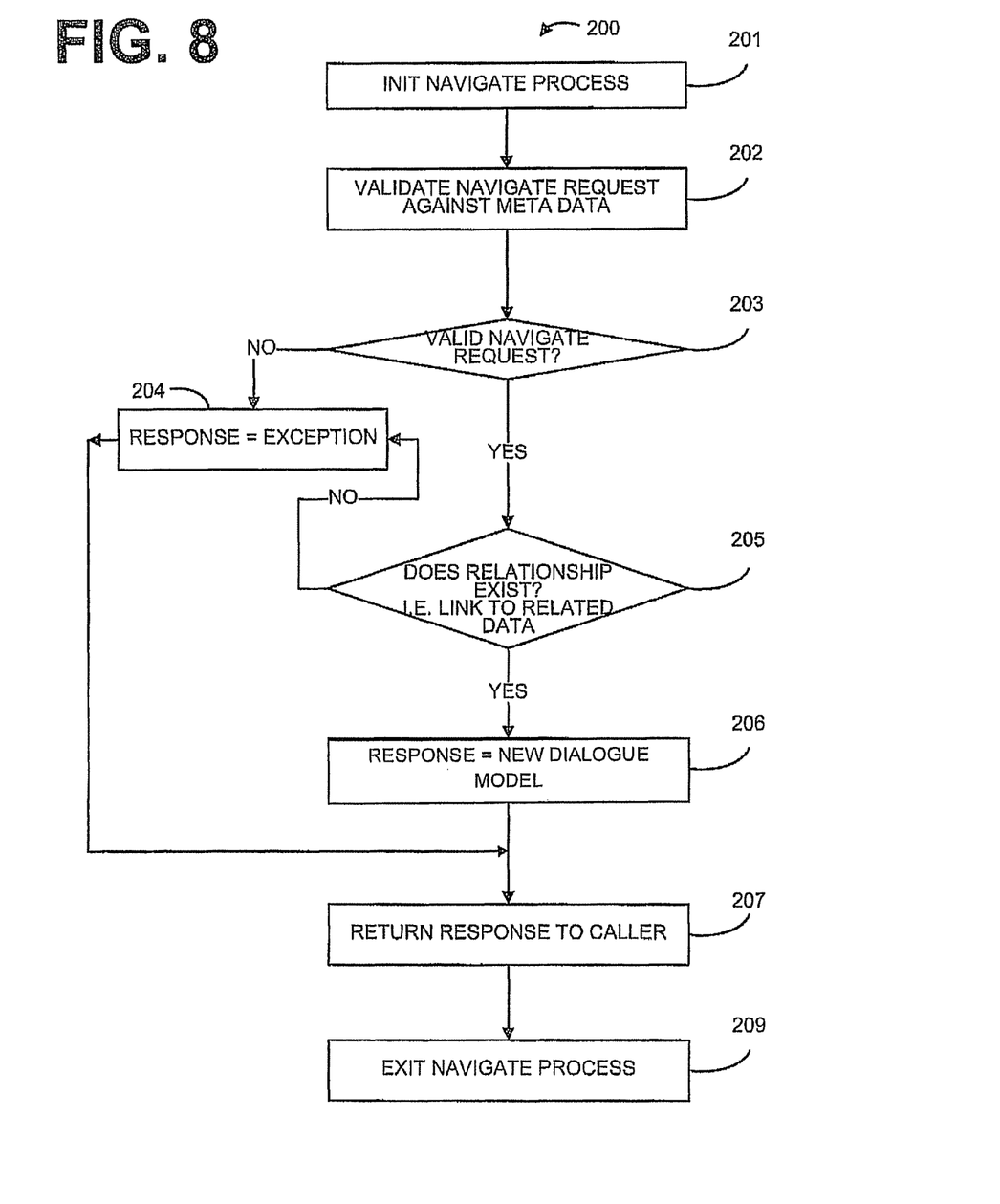
FIG. 8 is a flow chart illustrating an example of the operation of the navigate process utilized in the dialogue model system of the present invention, as shown in FIGS. 2 and 4.

FIG. 8 is a flow chart illustrating an example of the operation of the navigate process 200 utilized in the dialogue model system 100 of the present invention, as shown in FIGS. 2 and 4. A navigate process accepts an entity identifier and a logical relationship name and returns a dialogue response. A successful navigate request returns a dialogue model identifier corresponding to the relationship name. If a non-recoverable error occurs, an exception is returned. If a recoverable error is found, then a redirection is returned. Navigations exist in the logical model and is one example of a redirection.

First at step 201, the navigate process 200 is initialized. This initialization includes startup routines and processes embedded in the BIOS of the server 11. The initialization also includes the establishment of data values for particular data structures utilized in the server 11. At step 202, the navigate process 200 validates the navigate request against metadata and determines if the navigate request is valid at step 203. If it is determined at step 203 that the navigate request is valid, then the navigate process 200 skips to step 205. However, if it is determined in step 203 that the navigate request is not valid, then the navigate process 200 determines the appropriate exception response at step 204. After determining the appropriate exception response, the navigate process 200 then skips to step 207.

At step 204, the navigate process 200 determines if a relationship (i.e. link) exists to related data. If it is determined at step 205 that a relationship does not exist, then the navigate process 200 returns to repeat step 204. However, if it is determined at step 205 that a relationship i.e. link to related data does exist, then the navigate process 200 assigns related data as a new dialogue model to the response to the caller, at step 206.

At step 207, the navigate process 200 returns the assigned response to the caller of the navigate process 200 and then exits at step 209.

Figure 9:
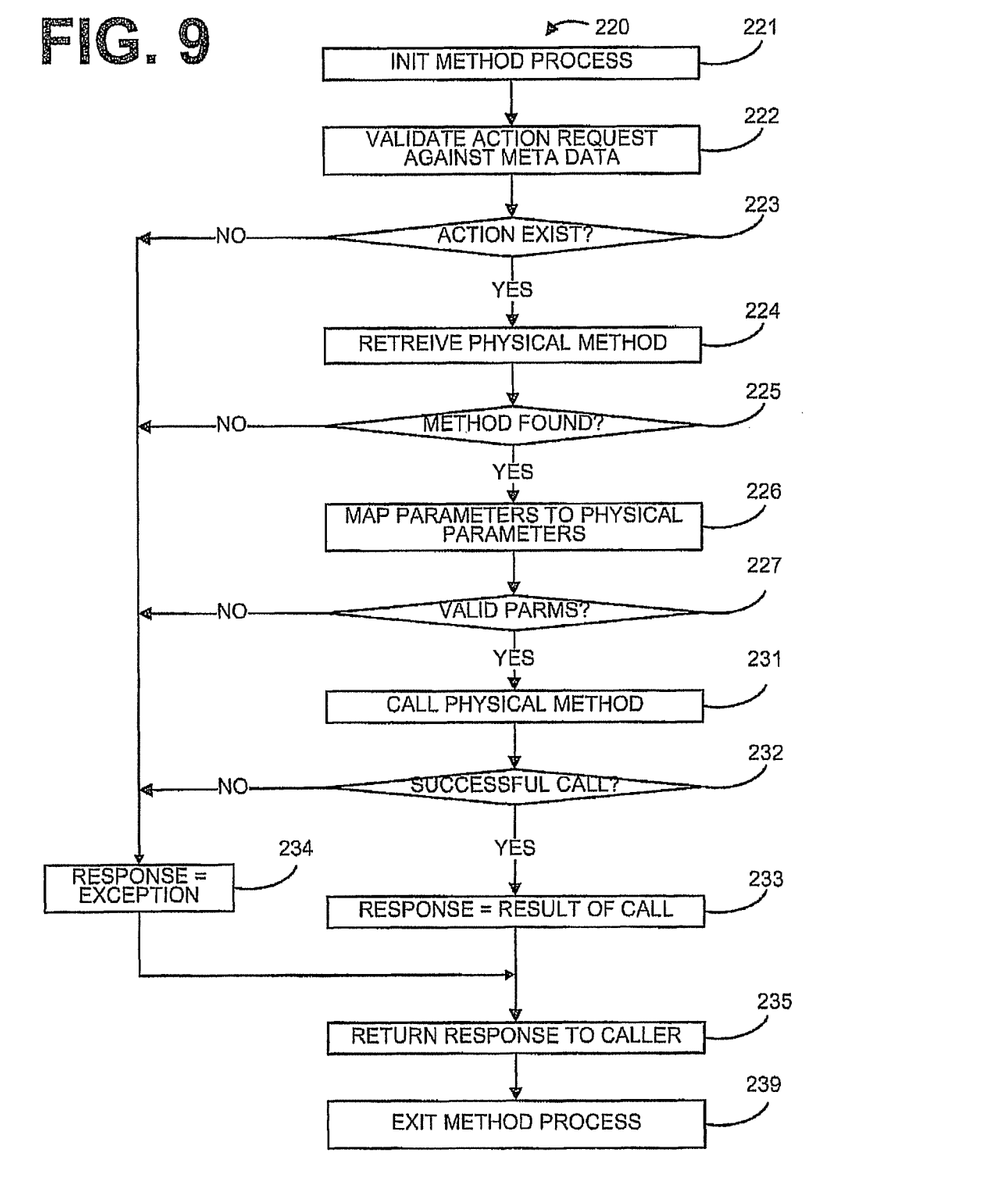
FIG. 9 is a flow chart illustrating an example of the operation of the method process utilized in the dialogue model system of the present invention, as shown in FIGS. 2 and 4.

FIG. 9 is a flow chart illustrating an example of the operation of the method process 220 utilized in the dialogue model system 100 of the present invention, as shown in FIGS. 2 and 4. A method process accepts an entity identifier and a logical method name and returns a dialogue response. A successful method request returns a value corresponding to the result of a physical object method call. If a non-recoverable error occurs, an exception is returned. If a recoverable error is found, then a redirection is returned.

First at step 221, the method process 220 is initialized. This initialization includes startup routines and processes embedded in the BIOS of the server 11. The initialization also includes the establishment of data values for particular data structures utilized in the server 11.

At step 222, the method process 220 validates the action request against metadata and determines if the action request exists at step 223. If it is determined at step 223 that the action request is not valid, then the method process 220 determines the appropriate exception response and skips to step 234. However, if it is determined in step 223 that the action request does exist, then the method process retrieves the physical method for the action at step 224. The physical method is obtained from the physical objects 82 in domain 80. Mapping of the logical objects to the physical objects is illustrated in the method process 220 in steps 224-233.

At step 225, the method process to 220 determines if the method is found in the physical objects 82. If it is determined at step 225 that the physical method was not found, then the method process 220 determines the appropriate exception response and skips to step 234. However, if the physical method was found, then the parameters of the logical method are mapped to the physical parameters, at step 226.

At step 227, the method process 220 determines if the physical parameters are valid. If it is determined at step 227 that the physical parameters are not valid, then the method process 220 determines the appropriate exception response and skips to step 234. However, if the physical parameters are valid, then the method process 220 calls a physical method at step 231.

At step 232, it is determined if the call to the physical method was successful. If it is determined at step 232 that the call to the physical method was not successful, then the method process 220 determines the appropriate exception response and skips to step 234. However, if the call to the physical method was successful, then the method process 220 assigns the result of the call to the response to be returned to the caller of the method process 220. The method process 220 then skips to step 235.

At step 234, the appropriate exception response is assigned to the response to be returned to the caller of the method process 220.

At step 235, the method process 220 returns the assigned response to the caller of the method process 220 and then exits at step 239.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for simplifying object mapping for an external interface for a computer system, comprising:
   performing processing associated with receiving a client request for action from the external interface, the external interface comprising a human being or a computer program;
   performing processing associated with associating the client request to a logical object in order to minimize a representational gap between the client request and a physical object using the logical object, wherein the associating comprises accepting an entity identifier and a property name and validating that the client request is a query request, wherein the logical object comprises a dialogue process and a collection of metadata that describes an entity definition, wherein the dialogue process comprises a query subroutine comprising the query request and processing the query request to return a dialogue response, wherein the dialogue response comprises a list of dialog records of corresponding values from the physical object if a successful query occurs, and a redirection is returned if a non-successful recoverable query occurs, the dialogue response also comprises a value comprising: value, exception, or the redirection, wherein the redirection is constructed with the entity identifier to a new dialog model that can be used to recover from an error;
   performing processing associated with converting the logical object to a physical object that resides in an object relational mapping using information from the query request;
   performing processing associated with mapping between the physical object that resides in the object relational mapping and a database; and
   performing processing associated with responding to the query request using the object relational mapping in order to simplify the external interface by minimizing the representational gap between the external interface and the physical object using the logical object.

2. The method of claim 1, wherein the database comprises formatted text.

3. The method of claim 1, wherein the database comprises: Structure Query Language (SQL), American Standard Code for Information Interchange (ASCII), or Extensible Markup Language (XML), or any combination thereof.

4. The method of claim 1, wherein the dialogue process further comprises a subroutine comprising: read, write, method, or navigate, or any combination thereof.

5. The method of claim 1, wherein the dialogue response is a dialog record of corresponding values from the physical object if a successful read occurs; and a redirection is returned if a non-successful recoverable read occurs.

6. The method of claim 1, wherein the dialogue response comprises a list of dialog records of corresponding values from the physical object if a successful write occurs; and a redirection is returned if a non-successful recoverable write occurs.

7. The method of claim 1, wherein the dialogue response is a dialog record of corresponding values from the physical object if a successful method occurs; and a redirection is returned if a non-successful recoverable method occurs.

8. The method of claim 1, wherein the dialogue response is a redirection if a successful navigate occurs; and an exception is returned if a non-successful navigate occurs.

9. The method of claim 1, wherein the physical object comprises a collection of data or logic.

10. A system for simplifying object mapping for an external interface for a computer system, comprising:
    a memory;
    a processor configured for
    performing processing associated with receiving a client request for action from the external interface, the external interface comprising a human being or a computer program;
    performing processing associated with associating the client request to a logical object in order to minimize a representational gap between the client request and a physical object using the logical object, wherein the associating comprises accepting an entity identifier and a property name and validating that the client request is a query request, wherein the logical object comprises a dialogue process and a collection of metadata that describes an entity definition, wherein the dialogue process comprises a query subroutine comprising the query request and processing the query request to return a dialogue response, wherein the dialogue response comprises a list of dialog records of corresponding values from the physical object if a successful query occurs, and a redirection is returned if a non-successful recoverable query occurs, the dialogue response also comprises a value comprising: value, exception, or the redirection, wherein the redirection is constructed with the entity identifier to a new dialog model that can be used to recover from an error;
    performing processing associated with converting the logical object to a physical object that resides in an object relational mapping using information from the query request;
    performing processing associated with mapping between the physical object that resides in the object relational mapping and a database; and performing processing associated with responding to the query request using the object relational mapping in order to simplify the external interface by minimizing the representational gap between the external interface and the physical object using the logical object.

11. The system of claim 10, wherein the database comprises formatted text.

12. The system of claim 10, wherein the database comprises: Structure Query Language (SQL), American Standard Code for Information Interchange (ASCII), or Extensible Markup Language (XML), or any combination thereof.

13. The system of claim 10, wherein the dialogue process further comprises a subroutine comprising: read, write, method, or navigate, or any combination thereof.

14. The system of claim 10, wherein the dialogue response is a dialog record of corresponding values from the physical object if a successful read occurs; and a redirection is returned if a non-successful recoverable read occurs.

15. The system of claim 10, wherein the dialogue response comprises a list of dialog records of corresponding values from the physical object if a successful write occurs; and a redirection is returned if a non-successful recoverable write occurs.

16. The system of claim 10, wherein the dialogue response is a dialog record of corresponding values from the physical object if a successful method occurs; and a redirection is returned if a non-successful recoverable method occurs.

17. The system of claim 10, wherein the dialogue response is a redirection if a successful navigate occurs; and an exception is returned if a non-successful navigate occurs.

18. The system of claim 10, wherein the physical object comprises a collection of data or logic.

* * * * *